United States Patent
Hed et al.

(10) Patent No.: US 12,274,381 B2
(45) Date of Patent: Apr. 15, 2025

(54) DISPLAY AND STORAGE STAND FOR CROSS-COUNTRY SNOW SKI OR CROSS-COUNTRY ROLLER SKI

(71) Applicants: Paul A. Hed, Ham Lake, MN (US); Samantha E. Hed, Ham Lake, MN (US); Jacob S. Strand, St. Louis Park, MN (US)

(72) Inventors: Paul A. Hed, Ham Lake, MN (US); Samantha E. Hed, Ham Lake, MN (US); Jacob S. Strand, St. Louis Park, MN (US)

(73) Assignee: Novus-Lacuna LLC, Ham Lake, MN (US)

( * ) Notice: Subject to any disclaimer, the term of this patent is extended or adjusted under 35 U.S.C. 154(b) by 0 days.

(21) Appl. No.: 18/692,583

(22) PCT Filed: Sep. 15, 2022

(86) PCT No.: PCT/US2022/043671
§ 371 (c)(1),
(2) Date: Mar. 15, 2024

(87) PCT Pub. No.: WO2023/043932
PCT Pub. Date: Mar. 23, 2023

(65) Prior Publication Data
US 2024/0382019 A1    Nov. 21, 2024

Related U.S. Application Data

(60) Provisional application No. 63/244,895, filed on Sep. 16, 2021.

(51) Int. Cl.
A47F 7/00 (2006.01)
A47B 81/00 (2006.01)
A63C 11/02 (2006.01)

(52) U.S. Cl.
CPC .......... *A47F 7/0028* (2013.01); *A47B 81/005* (2013.01); *A63C 11/028* (2013.01); *Y10T 70/5009* (2015.04)

(58) Field of Classification Search
CPC .......... A47F 7/0028; B60R 9/00; B60R 9/12; A63C 11/028; A47B 81/005; A47B 81/064; Y10T 70/5009
See application file for complete search history.

(56) References Cited

U.S. PATENT DOCUMENTS

| | | | | |
|---|---|---|---|---|
| 814,980 | A | * | 3/1906 | McCloskey et al. ..... A47F 7/30 211/208 |
| 3,504,405 | A | | 4/1970 | Elliot-Smith |

(Continued)

OTHER PUBLICATIONS

International Search Report and Written Opinion for related PCT Application No. PCT/US2022/043671, mailed on Jan. 6, 2023 (10 pgs).

*Primary Examiner* — Ko H Chan
(74) *Attorney, Agent, or Firm* — Brooks, Cameron & Huebsch, PLLC (57) ABSTRACT

The present disclosure provides for a display and storage stand for cross-country snow skis or cross-country roller skis. The display and storage stand includes a mounting bracket for attachment to a wall, an attachment bracket that extends from the mounting bracket, a ski bracket, that releasably connects to the mounting bracket and a support rod extending laterally across the ski bracket. The ski bracket includes frame members that define zones in which to receive at least a portion of the ski binding device of a pair of cross-country skis. The movable latch of the ski binding device releasably attaches to the support rod to position the base surface of the pair of cross-country skis between the attachment bracket and the support rod.

20 Claims, 9 Drawing Sheets

(56) References Cited

U.S. PATENT DOCUMENTS

| | | | | |
|---|---|---|---|---|
| 3,604,228 | A | | 9/1971 | Conlon |
| 3,854,641 | A | * | 12/1974 | Kohls ........................ B60R 9/12 |
| | | | | 224/323 |
| 3,905,481 | A | * | 9/1975 | Laterra ................ A63C 11/028 |
| | | | | D6/552 |
| 4,033,460 | A | * | 7/1977 | Alexandre ........... A63C 11/028 |
| | | | | 211/35 |
| 4,062,453 | A | * | 12/1977 | Gorlach ............... A63C 11/021 |
| | | | | 211/70.5 |
| 4,508,229 | A | * | 4/1985 | Yost, Jr. ............... A63C 11/028 |
| | | | | D6/552 |
| 5,316,155 | A | | 5/1994 | Collins et al. |
| 6,681,940 | B1 | * | 1/2004 | Cash ........................ B25H 3/04 |
| | | | | 211/70.6 |
| 8,662,321 | B1 | | 3/2014 | Raper |
| 8,998,007 | B1 | | 4/2015 | Grossmann |
| 2011/0062295 | A1 | | 3/2011 | Totman |
| 2014/0312598 | A1 | | 10/2014 | Giordani |
| 2022/0060194 | A1 | | 2/2022 | Yoon et al. |

* cited by examiner

DISPLAY AND STORAGE STAND FOR CROSS-COUNTRY SNOW SKI OR CROSS-COUNTRY ROLLER SKI

This application is a National Stage Application under 35 U.S.C. § 371 of International Application Number PCT/US2022/043671, filed Sep. 15, 2022, and published as WO 2023/043932 A1 on Mar. 23, 2023, which claims the benefit to U.S. Provisional Application 63/244,895, filed Sep. 16, 2021, the entire contents of which are incorporated herein by reference in its entirety.

FIELD OF DISCLOSURE

Embodiments of the present disclosure are directed towards a display and storage stand, more specifically, a display and storage stand for cross-country snow skis or cross-country roller skis.

BACKGROUND

A person involved with the sport of cross-country skiing typically has multiple pairs of cross-country snow skis, cross-country ski poles and, often-times, cross-country roller skis. Some of these skis and/or poles are the ones in current use, while others are retired, but not forgotten. When not in use, however, the skis and poles are usually placed in a closet or some other out of the way location. During the ski season, however, this makes accessing the equipment currently being used difficult.

In addition to being difficult to access, when the ski equipment is placed in the closet the aesthetic quality of these cross-country snow skis, cross-country poles and/or cross-country roller skis cannot be appreciated. To a cross-country skier, the colors used by the various ski manufactures in decorating the poles and the skis, along with the ski shape, size and ski binding provide a reminder of ski trends and technology of the past and the present.

In addition to their aesthetic quality, the athlete's cross-country snow skis often have race stickers on the upper ski surface that remind them of their hard-fought battles to reach the finish line. These stickers also allow others to see the various races accomplished on the skis. These stickers have an aesthetic quality that can only be appreciated if the skis are displayed.

Techniques for displaying cross-country snow skis, however, are less then ideal. Often-times older pairs of cross-country snow skis are simply screwed to the wall. Such display techniques are not acceptable for skis that have not yet been retired. Also, such display techniques ruin the skis that could otherwise be used again. As such, there is a need in the art for a display and storage stand for cross-country snow skis, cross-country poles and/or cross-country roller skis that not only displays such equipment but also allows an aesthetically pleasing way of providing ready access to the equipment.

SUMMARY

The present disclosure provides various embodiments directed towards a display and storage stand for cross-country snow skis, cross-country ski poles and cross-country roller skis. The display and storage stand of the present disclosure allows for a person to not only display multiple pairs of cross-country snow skis, cross-country poles, and cross-country roller skis, but also allows for their easy access.

According to the embodiments of the present disclosure, the display and storage stand of the present disclosure is for a pair of cross-country snow skis or cross-country roller skis. As discussed herein, each cross-country ski or cross-country roller ski includes a top surface, a base surface opposite the top surface and a ski binding device on the top surface, the ski binding device having a movable latch to releasably bind to a cross-country ski boot. The display and storage stand includes a mounting bracket for attachment to a wall, where the mounting bracket includes a first major surface. The display and storage stand further includes a ski bracket, an attachment bracket having a first portion extending from the ski bracket and a second portion that extends from the mounting bracket and a support rod extending laterally across the ski bracket, each of which is discussed more fully herein.

For the various embodiments, the ski bracket includes a first frame member, a second frame member, a third frame member and at least one of a first lateral member. The first frame member, the second frame member and the third frame member extend in a common direction away from each of the at least one of the first lateral member. A portion of at least the first frame member, the second frame member and the at least one of first lateral member are spaced apart to define a first zone in which to receive at least a portion of the ski binding device of a first cross-country ski of the pair of cross-country skis. Similarly, a portion of at least the second frame member, the third frame member and the at least one of first lateral member are spaced apart to define a second zone in which to receive at least a portion of the ski binding device of a second cross-country ski of the pair of cross-country skis.

For the various embodiments, the attachment bracket includes a first portion that extends from the ski bracket and a second portion that extends from the mounting bracket, where the first portion and the second portion of the attachment bracket couple the ski bracket to the mounting bracket. The support rod extends laterally across the ski bracket parallel with the at least one of the first lateral member, where a first portion of the support rod extends through the first zone between the first frame member and the second frame member and a second portion of the support rod extends through the second zone between the second frame member and the third frame member. The first portion and the second portion of the support rod each have a predetermined length and a predetermined cross-sectional shape to releasably attach to the movable latch of the ski binding device to position, for example, the base surface of the pair of cross-country skis between the attachment bracket and the support rod.

According to the various embodiments of present disclosure, each of the first lateral member of the ski bracket includes a first major surface, where the first portion of the attachment bracket includes at least one of a first wall each having a first major surface and a second major surface opposite the first major surface, the first major surface spaced apart from and opposite the first major surface of each of the first lateral member of the ski bracket. The second portion of the attachment bracket includes a second wall having a first major surface spaced apart from and opposite the first major surface of the mounting bracket to define a groove. The groove can releasably receive the at least one of the first wall of the first portion of the attachment bracket, where at least a portion of the second major surface of the first portion of the attachment bracket contacts at least a portion of the first major surface of the mounting bracket. In one embodiment, the first portion of the attachment bracket includes a lateral wall that joins the first wall to the first lateral member to position the first major surface of the first wall of the first portion of the attachment bracket parallel with the first major surface of the first lateral member of the ski bracket, and where at least a portion of the first major surface of the second wall of the second portion of the attachment bracket is parallel with the first major surface of the mounting bracket to define the groove to releasably receive the first wall of the first portion of the attachment bracket. In an alternative embodiment, the first portion of the attachment bracket is a first cleat and the second portion of the attachment bracket is a second cleat, where the first cleat releasably seats against the second cleat to releasably couple the ski bracket to the mounting bracket.

For the various embodiments, each of the first frame member, the second frame member and the third frame member include a first surface that defines a first opening through each of the first frame member, the second frame member and the third frame member, where the first opening of each of the first frame member, the second frame member and the third frame member align to receive the support rod extending laterally across the ski bracket. In an additional embodiment, each of the first frame member, the second frame member and the third frame member include a second surface that defines a second opening through each of the first frame member, the second frame member and the third frame member, where the second opening of each of the first frame member, the second frame member and the third frame member align to receive the support rod extending laterally across the ski bracket.

For the various embodiments, the ski bracket can further include a second lateral member having a first major surface, a second major surface and a third major surface, where the first major surface is opposite both the second major surface and the third major surface. For the present embodiment, the first frame member, the second frame member, the at least one of the first lateral member and the second major surface of the second lateral member are spaced apart to define the first zone in which to receive at least a portion of the binding device of a first cross-country ski of the pair of cross-country skis. Similarly, the second frame member, the third frame member, the at least one of the first lateral member and the third major surface of the second lateral member are spaced apart to define the second zone in which to receive at least a portion of the binding device of a second cross-country ski of the pair of cross-country skis.

The various embodiments of the display and storage stand can further include a cross-country ski pole support bracket to releasably hold a cross-country ski pole. For the various embodiments, the cross-country ski pole support bracket includes a wall having an interior curved surface to hold a shaft of the cross-country ski pole, an exterior surface relative to the interior curved surface, a first edge surface and a second edge surface, where each of the first edge surface and the second edge surface extend between the interior curved surface and the exterior surface and are spaced apart from each other to define an opening through which the shaft of the cross-country ski pole can pass to position at least a portion of the shaft of the cross-country ski pole on at least a portion of the interior curved surface of the cross-country ski pole support bracket.

For the various embodiments, the cross-country ski pole support bracket can extend from the ski bracket, where the ski bracket can include a first of the cross-country ski pole support bracket and a second of the cross-country ski pole support bracket. In one embodiment, the first of the cross-country ski pole support bracket can extend from the first frame member and the second of the cross-country ski pole support bracket can extend from the third frame member.

In an alternative embodiment, the cross-country ski pole support bracket can extend from the first major surface of the second lateral member, when present. For the present embodiment, the ski bracket can include a first of the cross-country ski pole support bracket and a second of the cross-country ski pole support bracket, where the first of the cross-country ski pole support bracket is adjacent to the first zone of the ski bracket and the second of the cross-country ski pole support bracket is adjacent to the second zone of the ski bracket.

Embodiments of the display and storage stand of the present disclosure can also include a hinge that joins the support rod to the ski bracket, where the support rod rotates about the hinge relative to the ski bracket to allow at least the portion of the binding device of the first cross-country ski of the pair of cross-country skis to pass into the first zone of the ski bracket and to allow the at least the portion of the binding device of the second cross-country ski of the pair of cross-country skis to pass into the second zone of the ski bracket. For the various embodiments, the hinge includes a first knuckle, a second knuckle and a pin rotatably connecting the first knuckle and second knuckle, where the first knuckle extends from the first frame member and seats the second knuckle, and where the support rod extends from the second knuckle to allow the support rod to rotate relative the first frame member between a closed position to an open position. In the open position at least the portion of the binding device of the first cross-country ski of the pair of cross-country skis can pass into the first zone of the ski bracket and at least the portion of the binding device of the second cross-country ski of the pair of cross-country skis can pass into the second zone of the ski bracket.

In addition to the hinge, the second frame member can include a second frame member surface defining a first socket and the third frame member can include a third frame member surface defining a second socket. For the various embodiments, the first socket and the second socket can receive and releasably hold the support rod when in the closed position. The second frame member can further include a first end adjacent the first lateral member and a second end longitudinally space from the first end, where the second end of the second frame member includes a first connector surface defining a first half of a slotted connector. The cross-country ski pole support bracket for the present embodiment can then include a second connector surface defining a second half of the slotted connector, where the first half and the second half of the slotted connector releasably join to position the cross-country ski pole support bracket on the ski bracket.

In an additional embodiment, the second lateral member when present in the display and storage stand can further includes a second frame member opening surface defining an opening through the second lateral member between the first major surface, and the second major surface and the third major surface. The first frame member and the third frame member can each also have an elongate shank and a frame member socket to releasably receive the elongate shank, where the elongate shank of each of the first frame member and the third frame member is joined to and extends from the first lateral member of the ski bracket towards the second lateral member. The frame member socket of each of the first frame member and the third frame member can joined to and extend from the second lateral member of the ski bracket towards the first lateral member. In the present embodiment, the support rod is coupled to the frame member socket of the first frame member and the third frame member. The second frame member includes a first end adjacent the first lateral member and a second end longitudinally space from the first end. The second end of the second frame member also includes a first connector surface defining a first half of a slotted connector and a support rod surface that extends from the second end of the second frame member towards the first end to define a slot. The slot releasably receives a portion of the support rod when the elongate shank of the first frame member and the third frame member are respectively seated in the frame member socket of the first frame member and third frame member. In addition to seating the first frame member and the third frame member in the frame member socket of the first frame member and third frame member the second end of the second frame member passes through the opening through the second lateral member to position the first connector surface defining the first half of the slotted connector clear of the first major surface, the second major surface and the third major surface of the second lateral member. The cross-country ski pole support bracket includes a second connector surface defining a second half of the slotted connector, where the first half and the second half of the slotted connector releasably join to position the cross-country ski pole support bracket on the ski bracket.

In one embodiment, the ski bracket includes only one of the first lateral member, where the only one of the first lateral member includes a first major surface, a second major surface and a third major surface, where the first major surface is opposite both the second major surface and the third major surface, where the first frame member, the second frame member and the third frame member extend in a common direction away from the first major surface of the mounting bracket and the first major surface, the second major surface and the third major surface of the first lateral member; where the portion of at least the first frame member, the second frame member and the second major surface of the first lateral member are spaced apart to define the first zone in which to receive at least a portion of the binding device of the first cross-country ski of the pair of cross-country skis, and where the portion of at least the second frame member, the third frame member and the third major surface of the first lateral member are spaced apart to define the second zone in which to receive at least the portion of the binding device of the second cross-country ski of the pair of cross-country skis.

BRIEF DESCRIPTION OF THE DRAWING

The drawings may not be to scale.

DETAILED DESCRIPTION

The present disclosure provides various embodiments directed towards a display and storage stand for cross-country snow skis, cross-country ski poles and/or cross-country roller skis. The display and storage stand of the present disclosure allows for a person to not only display multiple pairs of cross-country snow skis, cross-country poles and cross-country roller skis, but also allows for their easy access.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and/or eliminated to provide a number of additional embodiments of the present disclosure. In addition, the proportion and/or the relative scale of the elements provided in the figures are intended to illustrate certain embodiments of the present disclosure and should not be taken in a limiting sense.

Figure 1:
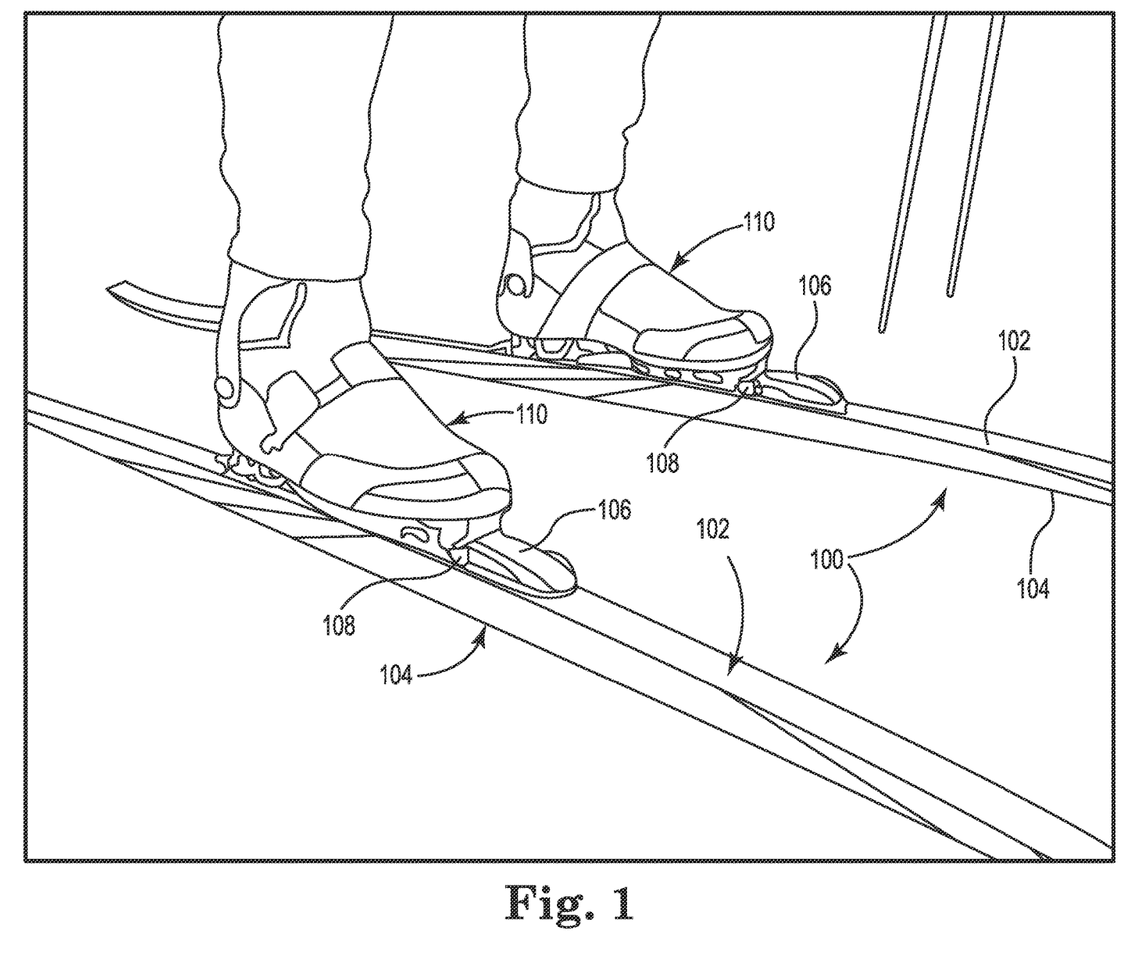
FIG. 1 provides an example of a pair of cross-country snow skis that can be displayed and stored on the display and storage stand of the present disclosure.
Figure 2:
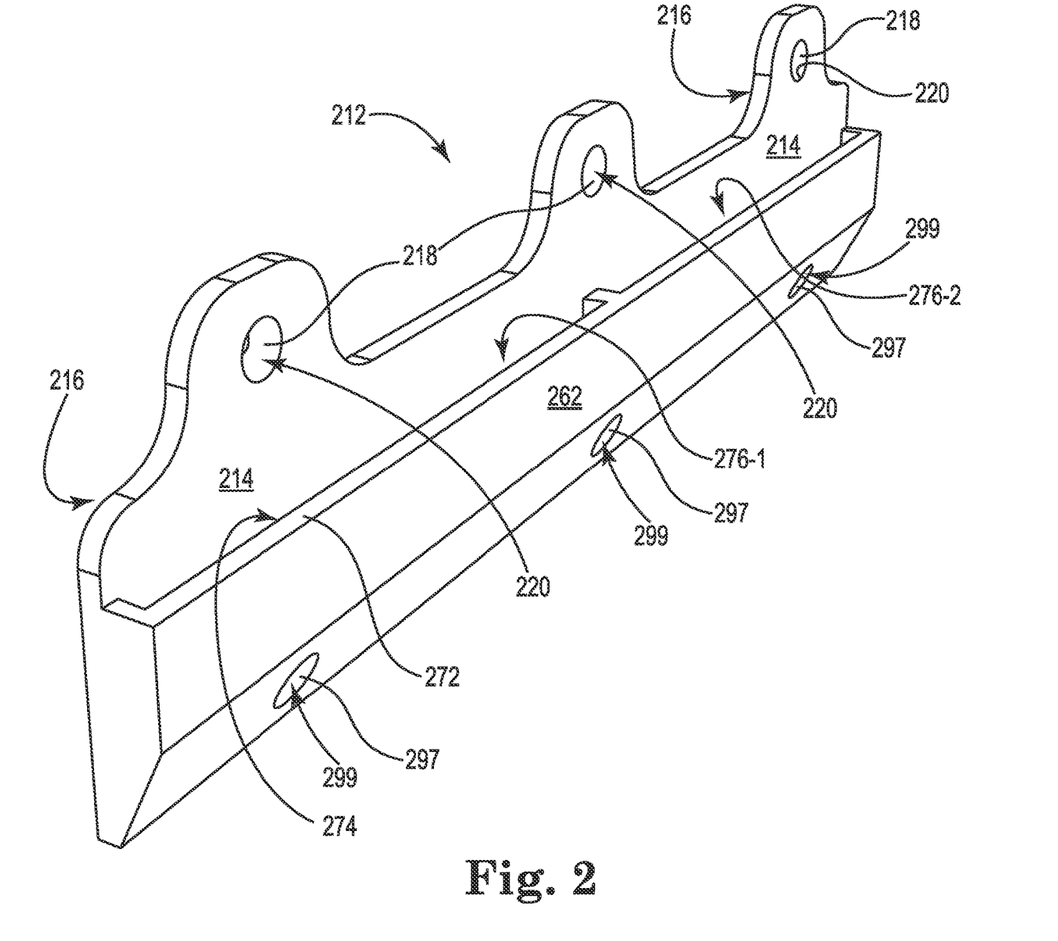
FIG. 2 is a perspective view of a mounting bracket and a second portion of the attachment bracket according to an embodiment of the present disclosure.
Figure 3A:
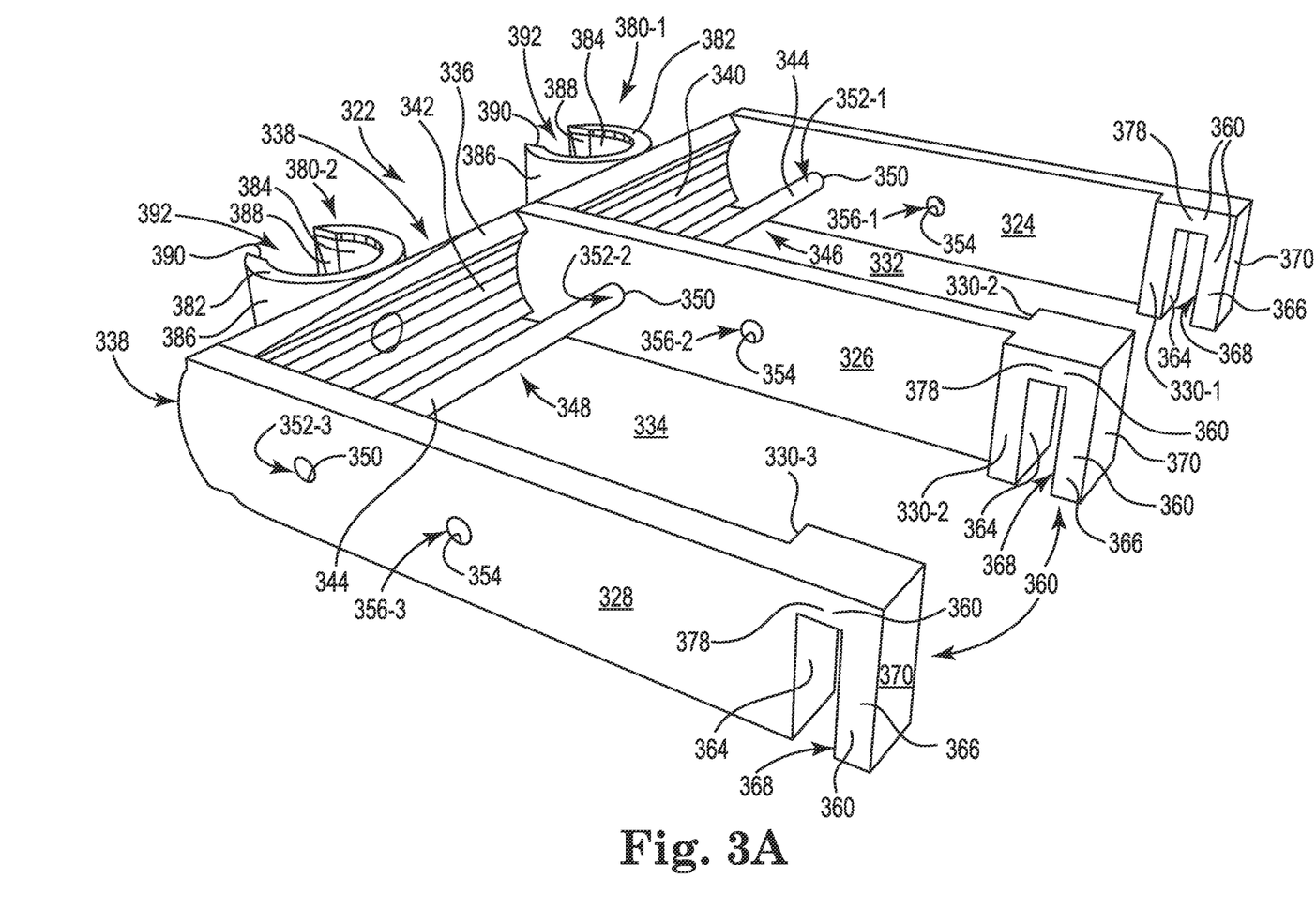
FIG. 3A is a perspective view of a ski bracket and a first portion of the attachment bracket according to an embodiment of the present disclosure.
Figure 3B:
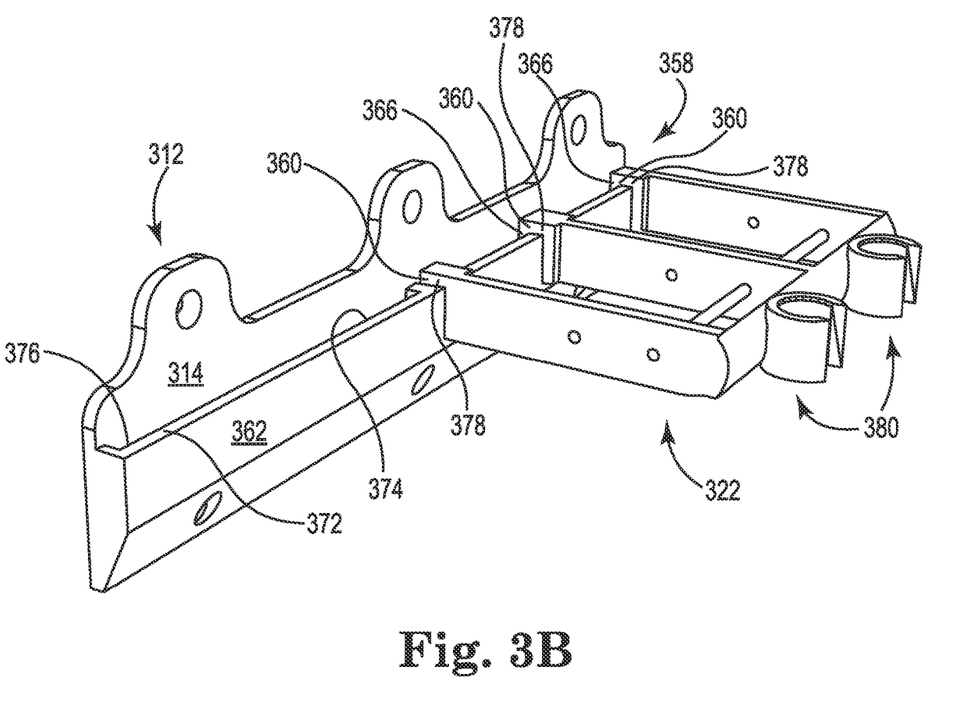
FIG. 3B is a perspective view of a mounting bracket, a ski bracket, and an attachment bracket according to an embodiment of the present disclosure.
Figure 4:
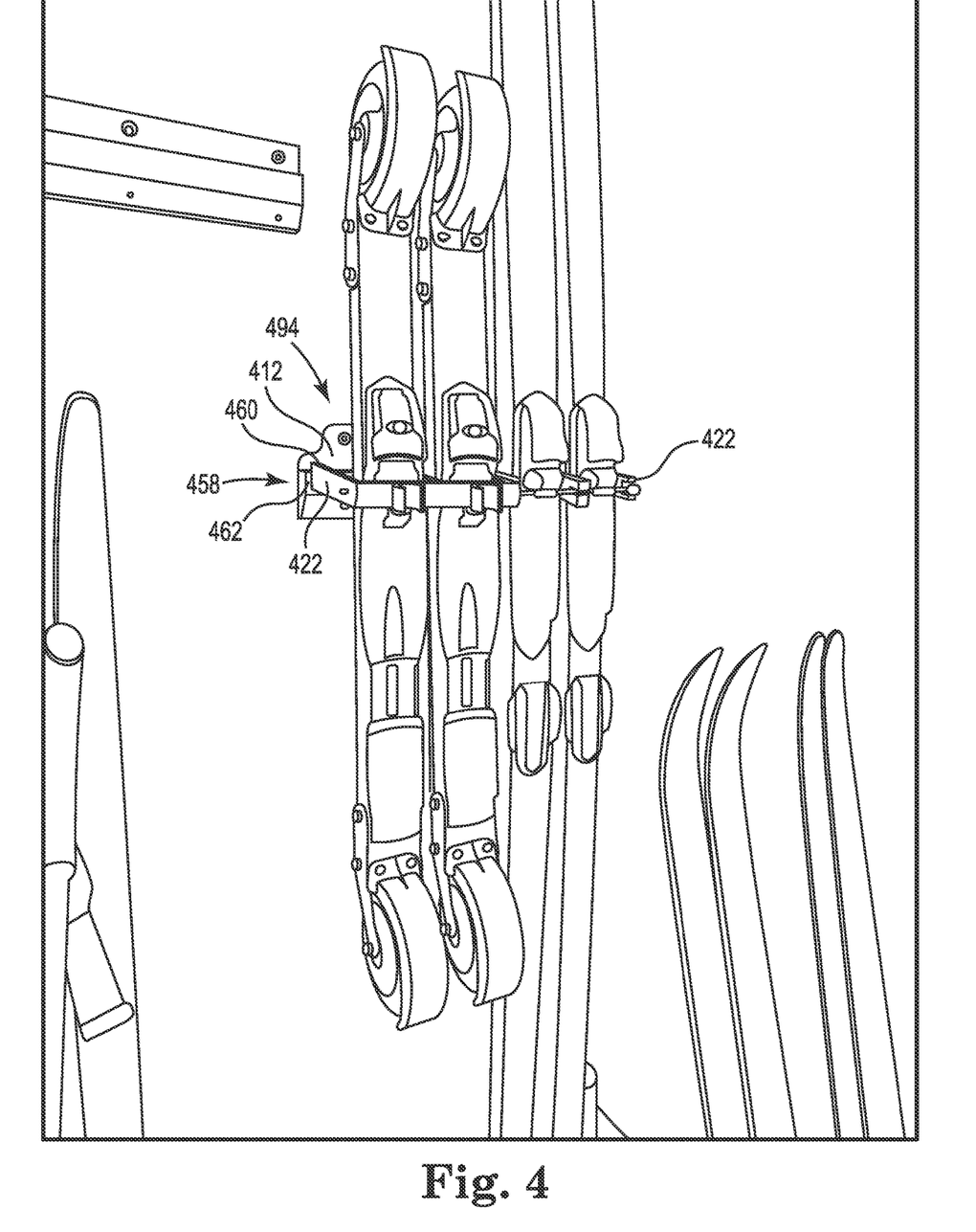
FIG. 4 is a perspective view of a display and storage stand according to an embodiment of the present disclosure.

Referring now to FIGS. 1-4 there is shown the components of, and an embodiment of, a display and storage stand of the present disclosure. Generally, the display and storage stand of the present disclosure includes a mounting bracket that can mount to a wall (e.g., a vertical wall), a ski bracket that can store and display cross-country snow skis, cross-country ski poles and/or cross-country roller skis, and an attachment bracket, where the attachment bracket releasably joins the ski bracket to the mounting bracket as discussed herein. FIG. 1 provides an example of a pair of cross-country snow skis that can be displayed and stored on the display and storage stand of the present disclosure. FIG. 2 provides an example of the mounting bracket and a second portion of the attachment bracket according to the present disclosure. FIG. 3A provides an example of the ski bracket and a first portion of the attachment bracket according to the present disclosure. FIG. 3B provides an example of the mounting bracket, the ski bracket, and the attachment bracket according to the present disclosure. FIG. 4 provides an example of the display and storage stand of the present disclosure, which includes the mounting bracket (e.g., seen in FIG. 2), two of the ski bracket (e.g., seen in FIG. 3A) and the attachment bracket (e.g., portions as seen in FIGS. 2 and 3).

As discussed herein, the display and storage stand is for a pair of cross-country snow skis or cross-country roller skis. As discussed herein, each cross-country ski or cross-country roller ski includes a top surface, a base surface opposite the top surface and a ski binding device on the top surface, the ski binding device having a movable latch to releasably bind to a cross-country ski boot. FIG. 1 provides a partial perspective view of a pair of cross-country snow skis 100 that can be used with the display and storage stand of the present disclosure. As seen in FIG. 1, the pair of cross-country snow skis 100 include the top surface 102, a base surface 104 opposite the top surface 102 and a ski binding device 106 on the top surface 102 of the cross-country snow ski 100. The ski binding device 106 having a movable latch 108 to releasably bind to a cross-country ski boot 110. Such structures are known in the art.

Referring to FIG. 2, there is shown an embodiment of a mounting bracket 212 that releasably receives the display and storage stand, as discussed herein. The mounting bracket 212 includes a first major surface 214 and a second major surface 216, where the second major surface 216 is opposite the first major surface 214. As illustrated, the mounting bracket 212 further includes surfaces 218 extending between the first major surface 214 and the second major surface 216 to define openings 220 through which a mounting shaft can pass to allow the mounting bracket 212 to be attached to a wall. Examples of the mounting shaft can include, but are not limited to, those that form a part of a screw (e.g., a wood screw), a hook or a bolt.

Referring to FIG. 3A, the display and storage stand further includes a ski bracket 322. For the various embodiments, the ski bracket 322 includes a first frame member 324, a second frame member 326, a third frame member 328 and at least one of a first lateral member 330. The first frame member 324, the second frame member 326 and the third frame member 328 each extend in a common direction away from each of the at least one of the first lateral member 330. As illustrated in FIG. 3A, the at least one of the first lateral member 330 includes a first lateral member 330-1 associated with the first frame member 324, a second lateral member 330-2 associated with the second frame member 326, and a third lateral member 330-3 associated with the third frame member 328.

The embodiment of the display and storage stand seen in FIG. 3A also includes a portion of at least the first frame member 324, the second frame member 326 and the at least one of first lateral member 330 that are spaced apart to define a first zone 332 in which to receive at least a portion of the ski binding device (106 seen in FIG. 1) of, for example, a first cross-country ski of the pair of cross-country skis. As seen in FIG. 3A, the combination of the first lateral member 330-1 associated with the first frame member 324 and the second lateral member 330-2 associated with the second frame member 326 help to define the first zone 332.

Similarly, a portion of at least the second frame member 326, the third frame member 328 and the at least one of first lateral member 330 are spaced apart to define a second zone 334 in which to receive at least a portion of the ski binding device (106 seen in FIG. 1) of a second cross-country ski of the pair of cross-country skis. As seen in FIG. 3A, the combination of the second lateral member 330-2 associated with the second frame member 326 and the third lateral member 330-3 associated with the third frame member 328 help to define the second zone 334.

For the various embodiments, the ski bracket 322 can further include a second lateral member 336. The second lateral member 336 includes a first major surface 338, a second major surface 340 and a third major surface 342, where the first major surface 338 is opposite both the second major surface 340 and the third major surface 342. For the present disclosure, the first frame member 324, the second frame member 326, the at least one of the first lateral member 330 and the second major surface 340 of the second lateral member 336 are spaced apart to define the first zone 332 in which to receive at least a portion of the binding device of a first cross-country ski of the pair of cross-country skis. Similarly, the second frame member 326, the third frame member 328, the at least one of the first lateral member 330 and the third major surface 342 of the second lateral member 336 are spaced apart to define the second zone 334 in which to receive at least a portion of the binding device of a second cross-country ski of the pair of cross-country skis.

The embodiments of the display and storage stand further include a support rod 344. For example, as illustrated in FIG. 3A, the support rod 344 extends laterally across the ski bracket 322 parallel with the at least one of the first lateral member 330 (330-1, 330-2 and 330-3 as illustrated in FIG. 3A). In the embodiment seen in FIG. 3A, the support rod 344 includes a first portion 346 and a second portion 348, where the first portion 346 of the support rod 344 extends through the first zone 332 between the first frame member 324 and the second frame member 326, while the second portion 348 of the support rod 344 extends through the second zone 334 between the second frame member 326 and the third frame member 328. The first portion 346 and the second portion 348 of the support rod 344 each have a predetermined length and a predetermined cross-sectional shape that allow them to releasably attach to the movable latch (108 seen in FIG. 1) of the ski binding device (106 seen in FIG. 1) to position the base surface (104 seen in FIG. 1) of the pair of cross-country skis (100 seen in FIG. 1) between an attachment bracket, as discussed herein, and the support rod 344.

For the various embodiments, each of the first frame member 324, the second frame member 326 and the third frame member 328 further include a first surface 350 that defines a first opening 352 through each of the first frame member 324 (e.g., 352-1), the second frame member 326 (e.g., 352-2) and the third frame member 328 (e.g., 352-3). In the embodiment seen in FIG. 3A, the first opening 352 through of each of the first frame member 324, the second frame member 326 and the third frame member 328 (e.g., 352-1, 352-2 and 352-3) align to receive the support rod 344, which extends laterally across the ski bracket 322. FIG. 3A also provides an additional embodiment in which each of the first frame member 324, the second frame member 326 and the third frame member 328 include a second surface 354 that defines a second opening 356 through each of the first frame member 324 (e.g., 356-1), the second frame member 326 (e.g., 356-2) and the third frame member 328 (e.g., 356-3). The second opening 356 of each of the first frame member 324, the second frame member 326 and the third frame member 328 (e.g., 356-1, 356-2 and 356-3) can align to receive the support rod 344 extending laterally across the ski bracket 322. For the various embodiments, having both the first openings 352 and the second openings 356 as provided herein allow the support rod 344 to be located at different positions relative the at least one of the first lateral member 330 to accommodate a cross-country snow ski and/or a cross-country roller ski for display and storage according to the present disclosure, an example of which is seen in FIG. 4.

For the various embodiments, the support rod 344 can have a circular cross-sectional shape with a diameter similar to or identical to the attachment bar of the cross-country ski boot that is used to connect cross-country ski boot to the cross-country snow ski or the cross-country roller ski via the movable latch of the ski binding. The support rod 344 can also have other cross-sectional shapes, such as square, triangular, or oval (apart from circular), where the first surface 350 and the second surface 354 can be shaped accordingly to provide the corresponding shape for the first opening 352 and the second opening 356.

The display and storage stand of the present disclosure further includes an attachment bracket (element 358 in FIG. 3B and 458 in FIG. 4), which includes two portions illustrated in FIGS. 2, 3A and 3B. The attachment bracket 358/458 includes a first portion 360 that extends from the ski bracket 322 and a second portion 262/362 that extends from the mounting bracket 212/312 (seen in FIGS. 2 and 3B). As discussed herein, the first portion 360 and the second portion 262/362 of the attachment bracket 358/458 releasably couple the ski bracket 322 to the mounting bracket 212/312 to provide the display and storage stand of the present disclosure, an example of which is seen in FIG. 4.

Regarding the first portion 360 seen in FIGS. 3A and 3B of the attachment bracket, each of the at least one of the first lateral member 330 of the ski bracket 322 includes a first major surface 364 (FIG. 3A). The first portion 360 of the attachment bracket 458 includes at least one of a first wall 366 each having a first major surface 368 and a second major surface 370 opposite the first major surface 368. The first major surface 368 of the first wall 366 is spaced apart from and opposite the first major surface 364 of each of the first lateral member 330 of the ski bracket 322.

Regarding the second portion 262/362 seen in FIGS. 2 and 3B, the second portion 262/362 of the attachment bracket 358 includes a second wall 272/372 having a first major surface 274/374 spaced apart from and opposite the first major surface 214/314 of the mounting bracket 212/312 to define a groove 276. For the various embodiments, the groove 276 can releasably receive the at least one of the first wall 366 of the first portion 360 of the attachment bracket 358, where at least a portion of the second major surface 370 of the first portion 360 of the attachment bracket 358 contacts at least a portion of the first major surface 214/314 of the mounting bracket 212/312.

In the embodiment illustrated in FIGS. 3A and 3B, the first portion 360 of the attachment bracket 358 includes a lateral wall 378 that joins the first wall 366 to the first lateral member 330 of the ski bracket 322 to position the first major surface 368 of the first wall 366 of the first portion 360 of the attachment bracket parallel with the first major surface 364 of the first lateral member 330 of the ski bracket 322. For the present embodiment, at least a portion of the first major surface 374 of the second wall 372 of the second portion 362 of the attachment bracket 358 is parallel with the first major surface 314 of the mounting bracket 312 to define the groove 376 to releasably receive the first wall 366 of the first portion 360 of the attachment bracket 358.

The embodiment illustrated in FIG. 2 provide for a first groove 276-1 and a second groove 276-2. For the present embodiments, each of the first groove 276-1 and the second groove 276-2 can releasably receive the at least one of the first wall 366 of the first portion 360 of a ski bracket 322. As a result, the second portion 262 as seen in FIG. 2 can releasably hold two of the ski bracket 322, an embodiment of which is seen in FIG. 4. FIG. 3B provides an illustration where the attachment bracket 358 is holding one of the ski bracket 322. It is appreciated that embodiments of the present disclosure can include a mounting bracket with only a single groove to releasably receive the at least one of the first wall 366 of the first portion 360 of just one of the ski bracket 322. Alternatively, the present disclosure includes a mounting bracket with more than two grooves to releasably receive the at least one of the first wall 366 of the first portion 360 of a number of ski brackets 322 up to the number of grooves present in the mounting bracket.

FIG. 2 further provides an illustration of the mounting bracket 212 and the second portion 262 of the attachment bracket 458 having at least one of a surface 297 that passes from the second portion 262 of the attachment bracket 458 through to the second major surface 216 of the mounting bracket 212 to define openings 299 through which a mounting shaft can pass to allow the mounting bracket 212 to be attached to a wall. Examples of the mounting shaft can include, but are not limited to, those that form a part of a screw (e.g., a wood screw), a hook or a bolt.

The various embodiments of the display and storage stand provided herein can further include a cross-country ski pole support bracket to releasably hold a cross-country ski pole. For example, the embodiment of display and storage stand as discussed includes a cross-country ski pole support bracket 380. The cross-country ski pole support bracket 380 includes a wall 382 having an interior curved surface 384 to hold a shaft of the cross-country ski pole. The wall 382 of the cross-country ski pole support bracket 380 further includes an exterior surface 386 relative to the interior curved surface 384 along with a first edge surface 388 and a second edge surface 390, where each of the first edge surface 388 and the second edge surface 390 extend between the interior curved surface 384 and the exterior surface 386. The first edge surface 388 and the second edge surface 390 are spaced apart from each other to define an opening 392 through which the shaft of the cross-country ski pole can pass to position at least a portion of the shaft of the cross-country ski pole on at least a portion of the interior curved surface 384 of the cross-country ski pole support bracket 380. For the various embodiments, the interior curved surface 384 of the wall 382 can taper to reduce the diameter of the opening defined by the interior curved surface 384. Such a configuration allows the shaft of the ski pole to better seat in the cross-country ski pole support bracket 380.

For the various embodiments, the cross-country ski pole support bracket 380 can extend from the ski bracket 322, where the ski bracket can include a first of the cross-country ski pole support bracket 380-1 and a second of the cross-country ski pole support bracket 380-2. As illustrated in FIG. 3. the cross-country ski pole support bracket 380 can extend from the first major surface 338 of the second lateral member 336. Specifically, for the present embodiment the ski bracket 322 can include a first of the cross-country ski pole support bracket 380-1 and a second of the cross-country ski pole support bracket 380-2, where the first of the cross-country ski pole support bracket 380-1 is adjacent to the first zone 332 of the ski bracket 322 and the second of the cross-country ski pole support bracket 380-2 is adjacent to the second zone 334 of the ski bracket 322.

Referring now to FIG. 4, there is shown the display and storage stand 494 that includes the mounting bracket 412 (e.g., 212 seen in FIGS. 2 and 312 seen in FIG. 3B), the ski bracket 422 (e.g., 322 seen in FIGS. 3A and 3B) and the attachment bracket 358/458 having its first portion 360/460 and second portion 462 (e.g., 262 seen in FIGS. 2 and 362 seen in FIG. 3B), where the components of each of the mounting bracket 312/412, the ski bracket 322/422 and the attachment bracket 358/458 are as discussed herein. FIG. 4 also provides an illustration of two of the ski bracket 422 being used with one of the mounting bracket 412.

Figure 5:
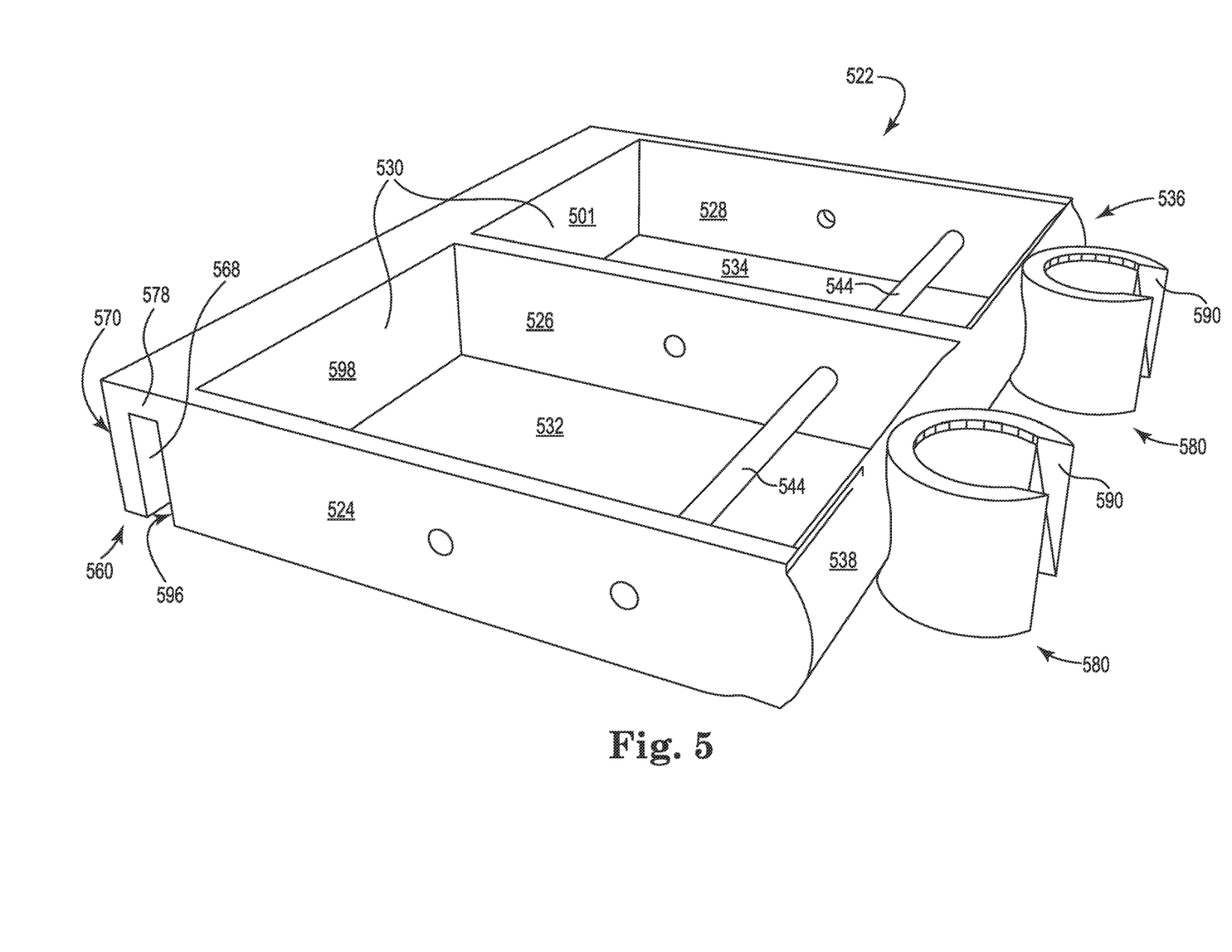
FIG. 5 a perspective view of a ski bracket and a first portion of the attachment bracket according to an embodiment of the present disclosure.

Referring now to FIG. 5, there is shown an embodiment of the ski bracket 522 that includes only one of the first lateral member 530, which is in contrast to the embodiment seen in FIGS. 3 and 4 that included three of the first lateral member. As illustrated in FIG. 5, the only one of the first lateral member 530 includes a first major surface 596, a second major surface 598 and a third major surface 501, where the first major surface 596 is opposite both the second major surface 598 and the third major surface 501. As with other embodiments, of the present embodiment, the first frame member 524, the second frame member 526 and the third frame member 528 of the ski bracket 522 extend in a common direction away from the first major surface 596, the second major surface 598 and the third major surface 501 of the first lateral member 530, along with the first major surface of the mounting bracket when the ski bracket 522 is mounted to the ski bracket via the attachment bracket, as discuss herein.

As seen in FIG. 5, a portion of at least the first frame member 524, the second frame member 526 and the second major surface 598 of the first lateral member 530 are spaced apart to define the first zone 532 in which to receive at least a portion of the binding device of the first cross-country ski of the pair of cross-country skis. Similarly, a portion of at least the second frame member 526, the third frame member 528 and the third major surface 501 of the first lateral member 530 are spaced apart to define the second zone 534 in which to receive at least the portion of the binding device of the second cross-country ski of the pair of cross-country skis. The remainder of the components for the display and storage stand of the present disclosure are as described herein.

Figure 6:
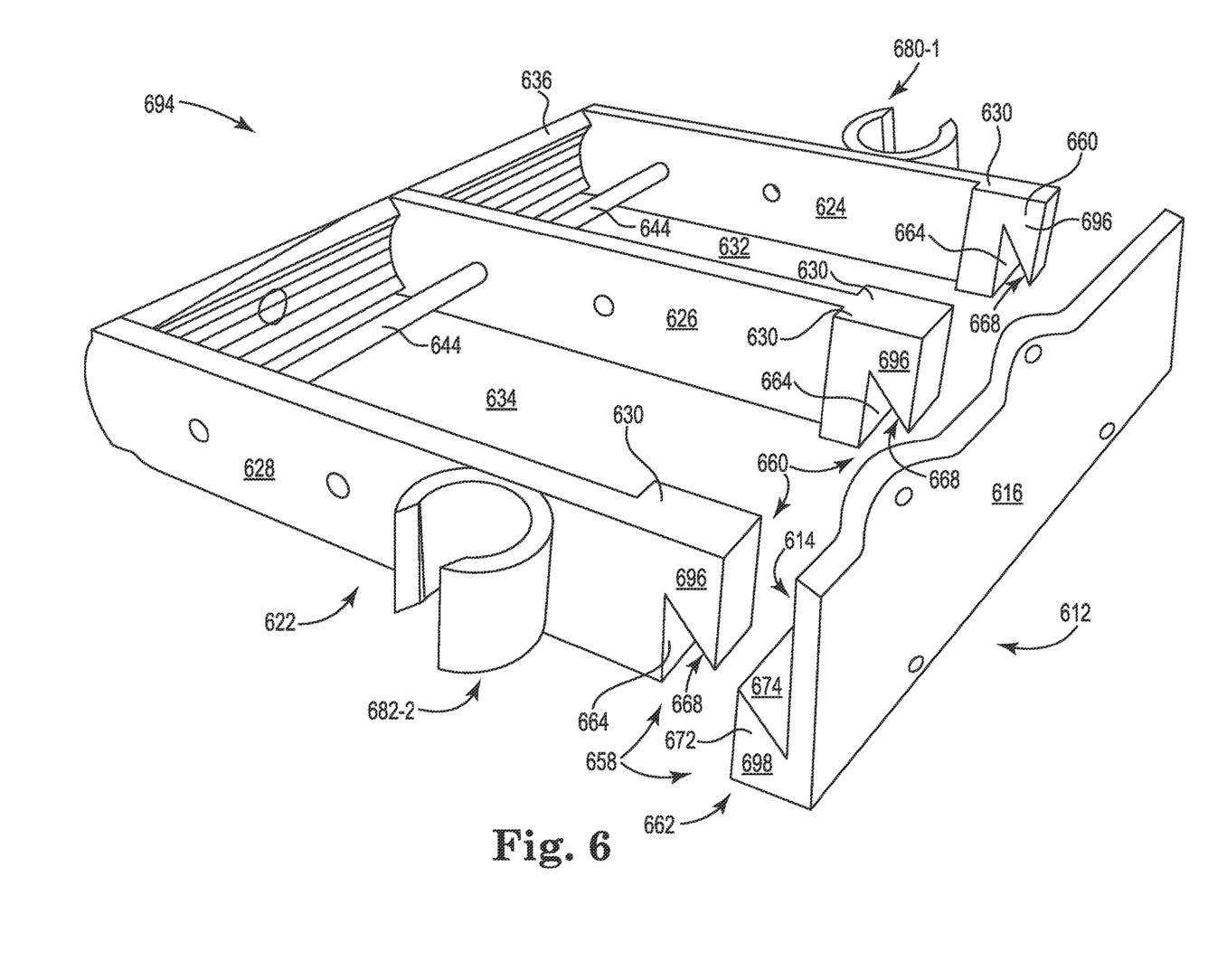
FIG. 6 a perspective view of a ski bracket and a first portion of the attachment bracket according to an embodiment of the present disclosure.

Referring now to FIG. 6, there is shown an alternative embodiment of the attachment bracket 658 for the display and storage stand 694 of the present disclosure. As illustrated, the first portion 660 of the attachment bracket 658 is configured as a first cleat 696 and the second portion 662 of the attachment bracket 658 is configured as a second cleat 698, where the first cleat 696 can releasably seat against the second cleat 698 to releasably couple the ski bracket 622 to the mounting bracket 612. In one embodiment, the first cleat 696 and second cleat 698 are configured as a "French Cleat", where the first major surface 674 of the second wall 672 is positioned at an angle of 30 to 45 degrees relative the first major surface 614 of the mounting bracket 612, while the first major surface 664 of the at least one of the first lateral member 630 and the first major surface 668 of the first portion 660 of the attachment bracket 658 form an angle of 30 to 45 degrees corresponding (e.g., identical) to the angle formed by the first major surface 674 relative the first major surface 614 of the mounting bracket 612. The embodiment of the display and storage stand 694 of the present disclosure also illustrates an embodiment in which the first of the cross-country ski pole support bracket 680-1 extends from the first frame member 624 and the second of the cross-country ski pole support bracket 680-2 can extend from the third frame member 628. The remainder of the components for the display and storage stand 694 of the present disclosure are as described herein.

Figure 7:
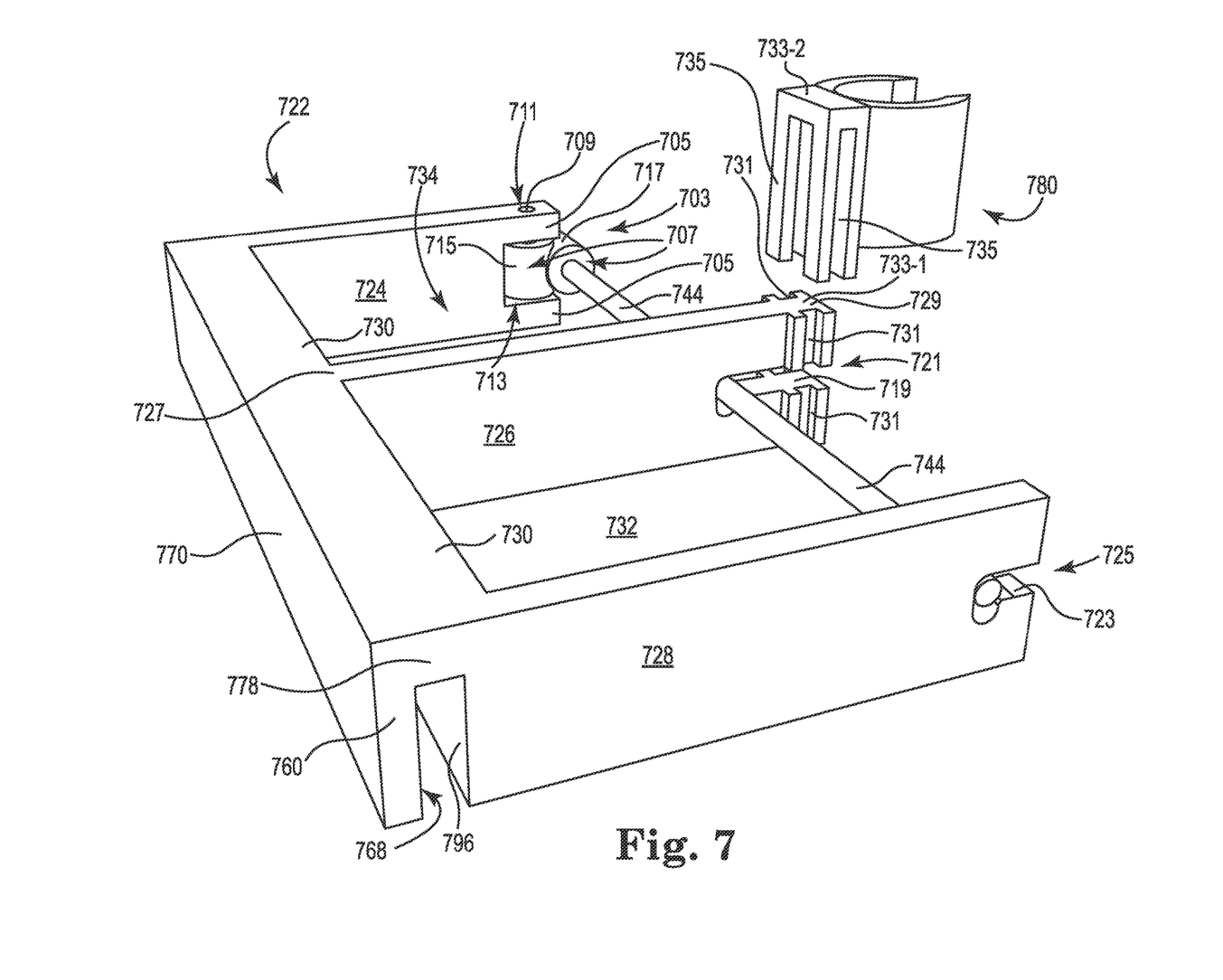
FIG. 7 a perspective view of a ski bracket and a first portion of the attachment bracket according to an embodiment of the present disclosure.

Referring now to FIG. 7, there is shown an alternative embodiment of the ski bracket 722 for use in the display and storage stand of the present disclosure. As illustrated in FIG. 7, the ski bracket 722 includes a first lateral member 730 and a first portion 760 of the attachment bracket as discussed herein (e.g., for FIG. 3A and FIG. 5). The embodiment of the ski bracket 722 in the present embodiment, however, further includes a hinge 703 that joins the support rod 744 to the ski bracket 722. For the various embodiments, the support rod 744 can rotate about the hinge 703 relative to the remainder of the ski bracket 722 to allow at least the portion of the binding device of the first cross-country ski of the pair of cross-country skis to pass into the first zone 732 of the ski bracket 722 and to allow the at least the portion of the binding device of the second cross-country ski of the pair of cross-country skis to pass into the second zone 734 of the ski bracket 722. Additionally, the skis can be clipped onto the support rod 744 while the support rod 744 is in the open position and the skis (on the support rod 744) can rotate into the zones 732 and 734.

For the various embodiments, the hinge 703 includes a first knuckle 705, a second knuckle 707 and a pin 709 rotatably connecting the first knuckle 705 and second knuckle 707. As illustrated, the first knuckle 705 includes a first surface 711 and a second surface 713 that define openings through which the pin 709 passes to rotatably connect to the second knuckle 707. The second knuckle 707 is at least partially housed or surrounded by the first knuckle 705. FIG. 7 also illustrates that the first knuckle 705 extends from the first frame member 724 and seats the second knuckle 707. The second knuckle 707 includes a first cylinder member 715 and a second cylinder member 717. Each of the first cylinder member 715 and the second cylinder member 717 include and an interior cylindrical surface defining an opening, where the opening in the first cylinder member 715 receives at least a portion of the pin 709 and the opening in the second cylinder member 717 receives at least a portion of the support rod 744. As illustrated in FIG. 7, the longitudinal axis of the first cylinder member 715 is perpendicular to the longitudinal axis of the second cylinder member 717. This configuration allows the longitudinal axis of the support rod 744 to be positioned parallel with the longitudinal axis of the first lateral member 730 when the support rod 744 is in a closed position, as discussed herein.

According to the embodiment seen in FIG. 7, the support rod 744 extends from the second knuckle 707 to allow the support rod 744 to rotate relative the first frame member 724 between a closed position (as seen in FIG. 7) to an open position, where the support rod 744 is proud of the free ends of the first frame member 724, the second frame member 726 and the third frame member 728. In the open position at least the portion of the binding device of the first cross-country ski of the pair of cross-country skis can pass into the first zone 732 of the ski bracket and at least the portion of the binding device of the second cross-country ski of the pair of cross-country skis can pass into the second zone 734 of the ski bracket. The support rod 744 can then be returned to is closed position where the movable latch of the ski binding device can be releasably attach to the support rod 744 to position the base surface of the pair of cross-country skis between the attachment bracket and the support rod.

In addition to the hinge 703, the second frame member 726 can include a second frame member surface 719 defining a first socket 721 and the third frame member 728 can include a third frame member surface 723 defining a second socket 725. For the various embodiments, the first socket 721 and the second socket 725 can receive and releasably hold the support rod 744 when in the closed position.

The second frame member 726 can further include a first end 727 adjacent the first lateral member 730 and a second end 729 longitudinally spaced from the first end 727, where the second end 729 of the second frame member 726 includes a first connector surface 731 defining a first half of a slotted connector 733-1. The cross-country ski pole support bracket 780 for the present embodiment can then include a second connector surface 735 defining a second half of the slotted connector 733-2, where the first half and the second half of the slotted connector 733 releasably join to position the cross-country ski pole support bracket 780 on the ski bracket. When the cross-country ski pole support bracket 780 is in place, it helps to lock the hinge 703 in place so support rod 744 and hinge 703 cannot accidently open i.e., when the slotted connector 733-2 is fully engaged in the slotted connector 733-1, the support rod 744 cannot open.

Figure 8:
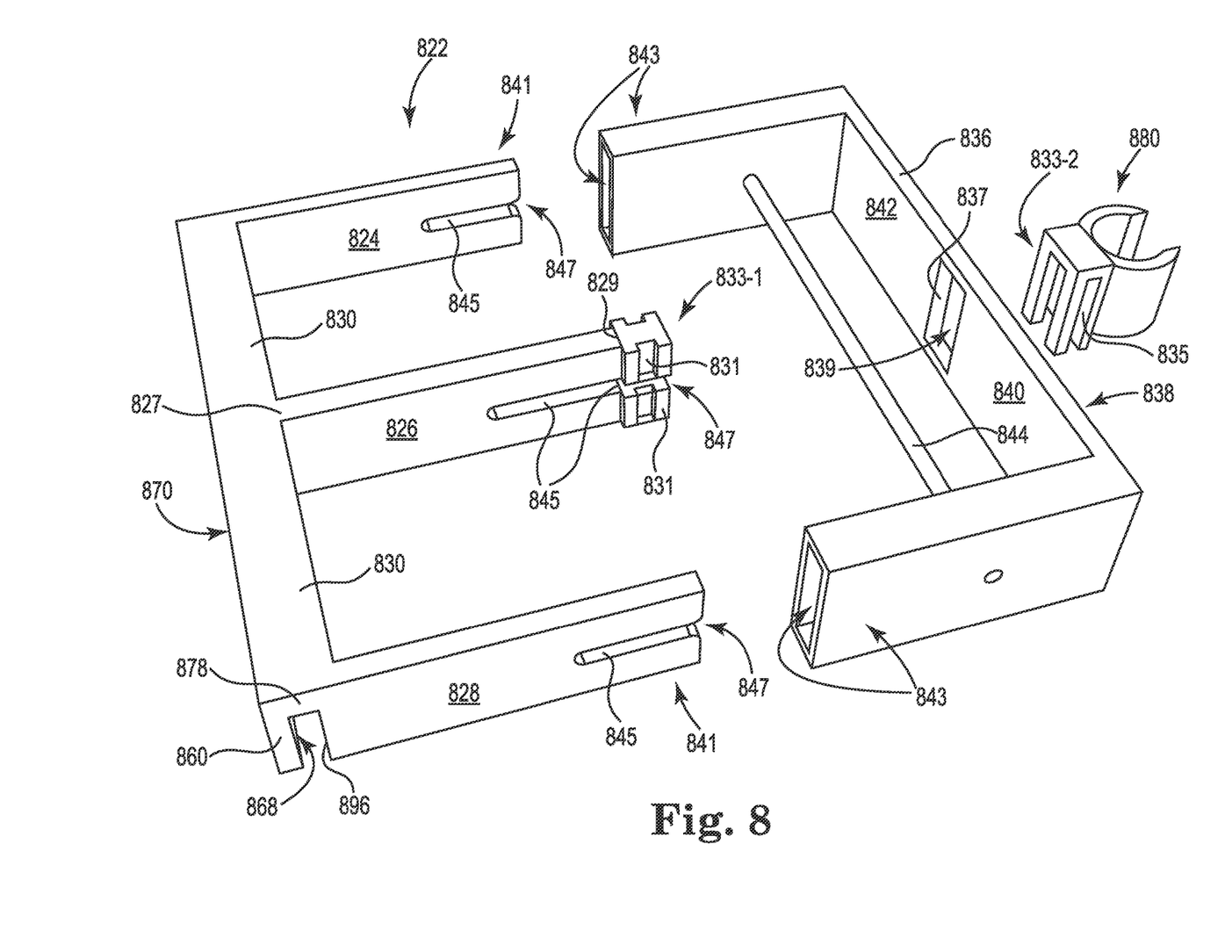
FIG. 8 a perspective view of a ski bracket and a first portion of the attachment bracket according to an embodiment of the present disclosure.

Referring now to FIG. 8, there is shown an additional embodiment of the ski bracket 822. The ski bracket 822 includes the second lateral member 836 having a second frame member opening surface 837 defining an opening 839 through the second lateral member 836 between the first major surface 838, and the second major surface 840 and the third major surface 842. The first frame member 824 and the third frame member 828 can each also have an elongate shank 841 and a frame member socket 843 to releasably receive the elongate shank 841. The elongate shank 841 of each of the first frame member 824 and the third frame member 828 is joined to and, as seen in FIG. 8, extends from the first lateral member 830 of the ski bracket 822 towards the second lateral member 836. The frame member socket 843 of each of the first frame member 824 and the third frame member 828 extend from the second lateral member 836 of the ski bracket 822 towards the first lateral member 830.

In the present embodiment, the support rod 844 is coupled to the frame member socket 843 of the first frame member 824 and the third frame member 828. The second frame member 826 includes a first end 827 adjacent the first lateral member 830 and a second end 829 longitudinally space from the first end 827. The second end 829 of the second frame member 826 also includes a first connector surface 831 defining a first half of a slotted connector 833-1.

The first frame member 824, the second frame member 826 and the third frame member 828 each further includes a support rod surface 845 that defines a slot 847. As illustrated for the second frame member 826, the support rod surface 845 extends from the first connector surface 831 and the second end 829 of the second frame member 826 towards the first end 827 to define the slot 847 in the second frame member 826. The slot 847 of each of the first frame member 824, the second frame member 826 and the third frame member 828 releasably receives a portion of the support rod 844 when the elongate shank 841 of the first frame member 824 and the third frame member 828 are respectively seated in the frame member socket 843 of the first frame member 824 and third frame member 828. In addition to seating the first frame member 824 and the third frame member 828 in the frame member socket 843 of the first frame member 824 and third frame member 828, the second end 829 of the second frame member 826 passes through the opening 839 in the second lateral member 836 to position the first connector surface 831 defining the first half of the slotted connector 833-1 clear or proud of the first major surface 838, the second major surface 840 and the third major surface 842 of the second lateral member 836. As previously discussed, the cross-country ski pole support bracket 880 includes a second connector surface 835 defining a second half of the slotted connector 833-2, where the first half and the second half of the slotted connector 833-1 and 833-2 releasably join to position the cross-country ski pole support bracket 880 on the ski bracket 822. For the present embodiment, when the first half of the slotted connector 833-1 is passed through the opening 839 in the second lateral member 836 the second half of the slotted connector 833-2 can be joined to the first half of the slotted connector 833-1 to help ensure the frame member socket 843 with the support rod 844 does not separate from the elongate shank 841 of the first frame member 824 and the third frame member 828.

The components of the display and storage stand of present disclosure can be formed from a variety of materials. In one embodiment, the same material can be used to form all of the components of the display and storage stand of present disclosure. Alternatively, different materials can be used to form different components of the display and storage stand of present disclosure. For example, the support rod can be formed from a metal or metal alloy, while the remainder of the components of the display and storage stand of present disclosure are formed from a polymeric material. Other combinations are possible.

Materials useful in forming the components of the display and storage stand of present disclosure include, but are not limited to, a metal, a metal alloy and/or a polymeric material, which can include cellulose base materials (e.g., wood). Examples of a metal and/or a metal alloy include steel (e.g., iron or carbon), alloy steel (e.g., stainless steel), brass, copper, bronze and gunmetal, among others. Examples of suitable polymeric materials include both thermoplastics and thermoset polymers, such as polyamine (e.g., nylons), polypropylene, copolymers that include polypropylene, acrylate polymers, polystyrene, acrylonitrile styrene acrylate, polylactic acid, polyethylene terephthalate, polyethylene terephthalate glycol-modified, polycarbonate, polyether ether ketone, polyetherketoneketone (PEKK), acrylonitrile butadiene styrene, polyetherimide, polyvinyl chloride, polyethylene (e.g., low density polyethylene, high density polyethylene) and copolymers that include polyethylene. The polymeric materials can also be fiber-reinforced and/or included in composite structures, such as alumide. In addition, components of the display and storage stand of present disclosure formed with a metal or metal alloy could be coated with one or more layers of a polymeric material, as provided herein.

There are a variety of manufacturing techniques that can be used in forming the display and storage stand of present disclosure. Such manufacturing techniques include, but are not limited to, injection molding manufacturing techniques, die-casting techniques, computer numerical control (CNC) manufacturing techniques, laser beam machining, 3D printing manufacturing techniques including fused filament fabrication manufacturing techniques and welding manufacturing techniques, among others.

The dimensions of the various components of the display and storage stand of present disclosure will depend upon the material(s) selected for its manufacture in addition to the dimensions of the cross-country snow skis, cross-country roller skis and/or cross-country ski poles intended to be displayed and stored on the stand of the present disclosure. To that end, the dimensions of the portions of the display and storage stand as discussed herein will depend on the dimensions of the cross-country skis and cross-country ski poles, where the dimensions can be selected so as to achieve the intended purpose of the present invention.

What is claimed is:

1. A display and storage stand for a pair of cross-country snow skis or cross-country roller skis, wherein each cross-country ski includes a top surface, a base surface opposite the top surface and a ski binding device on the top surface, the ski binding device having a movable latch to releasably bind to a cross-country ski boot, the display and storage stand comprising:
   a mounting bracket for attachment to a wall, the mounting bracket having a first major surface;
   a ski bracket having a first frame member, a second frame member, a third frame member and at least one of a first lateral member, wherein:

the first frame member, the second frame member and the third frame member extend in a common direction away from each of the at least one of the first lateral member;

wherein a portion of at least the first frame member, the second frame member and the at least one of first lateral member are spaced apart to define a first zone in which to receive at least a portion of the ski binding device of a first cross-country ski of the pair of cross-country skis, and wherein a portion of at least the second frame member, the third frame member and the at least one of first lateral member are spaced apart to define a second zone in which to receive at least a portion of the ski binding device of a second cross-country ski of the pair of cross-country skis;

an attachment bracket having a first portion that extends from the ski bracket and a second portion that extends from the mounting bracket, wherein the first portion and the second portion of the attachment bracket couple the ski bracket to the mounting bracket; and a support rod extending laterally across the ski bracket parallel with the at least one of the first lateral member, wherein a first portion of the support rod extends through the first zone between the first frame member and the second frame member and a second portion of the support rod extends through the second zone between the second frame member and the third frame member, wherein the first portion and the second portion of the support rod each have a predetermined length and a predetermined cross-sectional shape to releasably attach to the movable latch of the ski binding device to position the base surface of the pair of cross-country skis between the attachment bracket and the support rod.

2. The display and storage stand of claim 1, wherein each of the first lateral member of the ski bracket includes a first major surface;

wherein the first portion of the attachment bracket includes at least one of a first wall each having a first major surface and a second major surface opposite the first major surface, the first major surface spaced apart from and opposite the first major surface of each of the first lateral member of the ski bracket; and wherein the second portion of the attachment bracket includes a second wall having a first major surface spaced apart from and opposite the first major surface of the mounting bracket to define a groove to releasably receive the at least one of the first wall of the first portion of the attachment bracket, wherein at least a portion of the second major surface of the first portion of the attachment bracket contacts at least a portion of the first major surface of the mounting bracket.

3. The display and storage stand of claim 2, wherein the first portion of the attachment bracket includes a lateral wall that joins the first wall to the first lateral member to position the first major surface of the first wall of the first portion of the attachment bracket parallel with the first major surface of the first lateral member of the ski bracket; and wherein at least a portion of the first major surface of the second wall of the second portion of the attachment bracket is parallel with the first major surface of the mounting bracket to define the groove to releasably receive the first wall of the first portion of the attachment bracket.

4. The display and storage stand of claim 2, wherein the first portion of the attachment bracket is a first cleat and the second portion of the attachment bracket is a second cleat, wherein the first cleat releasably seats against the second cleat to releasably couple the ski bracket to the mounting bracket.

5. The display and storage stand of claim 1, wherein each of the first frame member, the second frame member and the third frame member include a first surface that defines a first opening through each of the first frame member, the second frame member and the third frame member, wherein the first opening of each of the first frame member, the second frame member and the third frame member align to receive the support rod extending laterally across the ski bracket.

6. The display and storage stand of claim 5, wherein each of the first frame member, the second frame member and the third frame member include a second surface that defines a second opening through each of the first frame member, the second frame member and the third frame member, wherein the second opening of each of the first frame member, the second frame member and the third frame member align to receive the support rod extending laterally across the ski bracket.

7. The display and storage stand of claim 1, further including a hinge that joins the support rod to the ski bracket, wherein the support rod rotates about the hinge relative to the ski bracket to allow at least the portion of the binding device of the first cross-country ski of the pair of cross-country skis to pass into the first zone of the ski bracket and to allow the at least the portion of the binding device of the second cross-country ski of the pair of cross-country skis to pass into the second zone of the ski bracket.

8. The display and storage stand of claim 7, wherein the hinge includes a first knuckle, a second knuckle and a pin rotatably connecting the first knuckle and second knuckle, wherein the first knuckle extends from the first frame member and seats the second knuckle, and wherein the support rod extends from the second knuckle to allow the support rod to rotate relative the first frame member between a closed position to an open position, where in the open position at least the portion of the binding device of the first cross-country ski of the pair of cross-country skis can pass into the first zone of the ski bracket and at least the portion of the binding device of the second cross-country ski of the pair of cross-country skis can pass into the second zone of the ski bracket.

9. The display and storage stand of claim 8, wherein the second frame member include a second frame member surface defining a first socket and the third frame member include a third frame member surface defining a second socket, wherein the first socket and the second socket receive and releasably hold the support rod when in the closed position.

10. The display and storage stand of claim 1, wherein the ski bracket further includes a second lateral member having a first major surface, a second major surface and a third major surface, where the first major surface is opposite both the second major surface and the third major surface, wherein:

the first frame member, the second frame member, the at least one of the first lateral member and the second major surface of the second lateral member are spaced apart to define the first zone in which to receive at least a portion of the binding device of a first cross-country ski of the pair of cross-country skis, and the second frame member, the third frame member, the at least one of the first lateral member and the third major surface of the second lateral member are spaced apart to define the second zone in which to receive at least a portion of the binding device of a second cross-country ski of the pair of cross-country skis.

11. The display and storage stand of claim 1, wherein the display further including a cross-country ski pole support bracket to releasably hold a cross-country ski pole.

12. The display and storage stand of claim 11, wherein the cross-country ski pole support bracket extends from the ski bracket.

13. The display and storage stand of claim 12, wherein the ski bracket includes a first of the cross-country ski pole support bracket and a second of the cross-country ski pole support bracket.

14. The display and storage stand of claim 13, wherein the first of the cross-country ski pole support bracket extends from the first frame member and the second of the cross-country ski pole support bracket extends from the third frame member.

15. The display and storage stand of claim 12, wherein the ski bracket includes the second lateral member of claim 8, wherein the cross-country ski pole support bracket extends from the first major surface of the second lateral member.

16. The display and storage stand of claim 15, wherein the ski bracket includes a first of the cross-country ski pole support bracket and a second of the cross-country ski pole support bracket, wherein the first of the cross-country ski pole support bracket is adjacent to the first zone of the ski bracket and the second of the cross-country ski pole support bracket is adjacent to the second zone of the ski bracket.

17. The display and storage stand of claim 11, wherein the second frame member includes a first end adjacent the first lateral member and a second end longitudinally space from the first end, wherein the second end of the second frame member includes a first connector surface defining a first half of a slotted connector; and
   the cross-country ski pole support bracket includes a second connector surface defining a second half of the slotted connector, wherein the first half and the second half of the slotted connector releasably join to position the cross-country ski pole support bracket on the ski bracket.

18. The display and storage stand of claim 10, wherein the second lateral member further includes a second frame member opening surface defining an opening through the second lateral member between the first major surface, and the second major surface and the third major surface;
   the first frame member and the third frame member each having an elongate shank and a frame member socket to releasably receive the elongate shank, wherein the elongate shank of each of the first frame member and the third frame member is joined to and extends from the first lateral member of the ski bracket towards the second lateral member, and the frame member socket of each of the first frame member and the third frame member is joined to and extends from the second lateral member of the ski bracket towards the first lateral member and wherein the support rod is coupled to the frame member socket of the first frame member and the third frame member;
   the second frame member includes a first end adjacent the first lateral member and a second end longitudinally space from the first end, wherein the second end of the second frame member includes a first connector surface defining a first half of a slotted connector, and a support rod surface that extends from the second end of the second frame member towards the first end to define a slot that releasably receives a portion of the support rod when:
      the elongate shank of the first frame member and the third frame member are respectively seated in the frame member socket of the first frame member and third frame member; and
      the second end of the second frame member passes through the opening through the second lateral member to position the first connector surface defining the first half of the slotted connector clear of the first major surface, the second major surface and the third major surface of the second lateral member; and
   a cross-country ski pole support bracket that includes a second connector surface defining a second half of the slotted connector, wherein the first half and the second half of the slotted connector releasably join to position the cross-country ski pole support bracket on the ski bracket.

19. The display and storage stand of claim 11, wherein the cross-country ski pole support bracket includes a wall having an interior curved surface to hold a shaft of the cross-country ski pole, an exterior surface relative to the interior curved surface, a first edge surface and a second edge surface, wherein each of the first edge surface and the second edge surface extend between the interior curved surface and the exterior surface and are spaced apart from each other to define an opening through which the shaft of the cross-country ski pole can pass to position at least a portion of the shaft of the cross-country ski pole on at least a portion of the interior curved surface of the cross-country ski pole support bracket.

20. The display and storage stand of claim 1, wherein the ski bracket includes only one of the first lateral member, wherein the only one of the first lateral member includes a first major surface, a second major surface and a third major surface, where the first major surface is opposite both the second major surface and the third major surface, wherein the first frame member, the second frame member and the third frame member extend in a common direction away from the first major surface of the mounting bracket and the first major surface, the second major surface and the third major surface of the first lateral member;
   wherein the portion of at least the first frame member, the second frame member and the second major surface of the first lateral member are spaced apart to define the first zone in which to receive at least a portion of the binding device of the first cross-country ski of the pair of cross-country skis, and
   wherein the portion of at least the second frame member, the third frame member and the third major surface of the first lateral member are spaced apart to define the second zone in which to receive at least the portion of the binding device of the second cross-country ski of the pair of cross-country skis.

* * * * *